United States Patent [19]
Fowler et al.

[11] Patent Number: 4,728,754
[45] Date of Patent: Mar. 1, 1988

[54] INTER-BUS SYSTEM

[75] Inventors: Glenville C. E. Fowler; David J. Tozer, both of Dorset, Great Britain

[73] Assignee: Plessey Overseas Limited, Ilford, England

[21] Appl. No.: 902,246

[22] Filed: Aug. 29, 1986

[30] Foreign Application Priority Data

Sep. 3, 1985 [GB] United Kingdom ............... 8521806

[51] Int. Cl.⁴ .............................................. H04Q 3/00
[52] U.S. Cl. .................................... 178/2 C; 178/2 D
[58] Field of Search ............ 178/2 R, 2 C, 2 D, 63 R, 178/63 B, 63 C, 29, 113; 375/36; 370/18

[56] References Cited

U.S. PATENT DOCUMENTS

| | | | |
|---|---|---|---|
| 3,597,549 | 8/1971 | Farmer et al. | 178/2 D |
| 4,292,623 | 9/1981 | Eswaran et al. | 178/3 X |
| 4,570,257 | 2/1986 | Olson | 370/94 |

Primary Examiner—Stafford D. Schreyer
Attorney, Agent, or Firm—Michael F. Oglo; Julian C. Renfro

[57] ABSTRACT

The inter-bus system provides the communication interconnection between communication systems to form a large telegraph packet switching exchange for example. The fast inter-bus system uses an RS-485 interface, however, the specific protocol used has particular speed advantages. The inter-bus system consists of a bus converter for each communication system interconnected by a bus involving 16 data bits, a pair of parity bits, clock, abort, transmit active, address strobe and grant return paths. The bus converters are chained by a grant link arrangement. The grant link is used to carry a grant pulse which is passed on around the chained bus converters to identify the master converter for an inter-bus system transfer. When the grant pulse is received by a bus converter wanting to transmit, that bus converter breaks the chain and performs the transmission required. When the transmission is complete the completing bus converter surrenders its master state by generating the grant pulse.

3 Claims, 2 Drawing Figures

INTER-BUS SYSTEM

FIELD OF THE INVENTION

The present invention relates to a inter-bus system providing a high speed communication interface between a number of communication systems.

The inter-bus system may be used as a high bandwidth communication link between a series of packet switching exchanges.

DESCRIPTION OF PRIOR ART

At present, a high bandwidth communication link is provided by a local area network (LAN), operating at 10 MHz. The problem with a LAN is that it is a serial bus controlled by a complex protocol. This results in a bandwidth below 1M bytes/sec.

STATEMENT OF THE OBJECTS OF INVENTION

An aim of the present invention is to provide an inter-bus system capable of working at a bandwidth of 10M bytes/sec.

A further aim of the present invention is to provide a multi-drop inter-bus system capable of tranferring data over a distance up to 15 metres with the same bandwidth as normal microprocessor buses.

An advantage of the present invention is that it is cheaper than most high speed long distance buses.

A further advantage of the present invention is that a simple protocol is used, maintaining maximum bus throughput.

According to the present invention, there is provided an inter-bus system for interconnecting a plurality of communication systems by way of an interfacing means, each communication system is provided with a bus converter for interfacing the inter-bus system with the bus of each communication system, the inter-bus system includes a grant return path, and the bus converters are chained by a grant link arrangement, used to carry a grant pulse which is passed on around the chained bus converters to identify the master converter for an inter-bus system transfer; wherein, when the grant pulse is received by a bus converter wanting to transmit, that bus converter breaks the chain and performs the transmission required, when the transmission is complete the completing bus converter surrenders its master state by generating the grant pulse.

BRIEF DESCRIPTION OF THE DRAWINGS

An embodiment of the present invention will now be described with reference to the accompanying drawings wherein.

DESCRIPTION OF THE PREFERRED EMBODIMENT

Figures 1, 2:
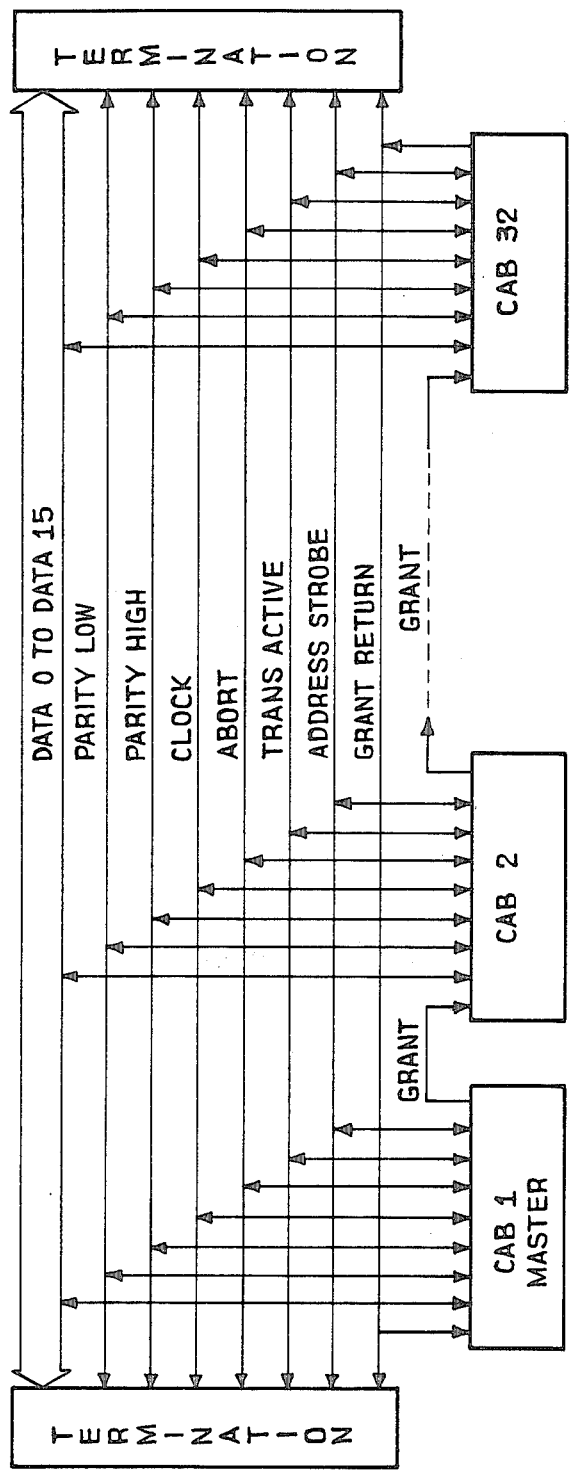
FIG. 1 shows a block diagram of an inter-bus system.
FIG. 2 shows a frame format.

Referring to FIG. 1, the inter-bus system is a 16 bit parallel bus with parity protection which operates over long distances using a multi-drop RS-485 standard interface. The bus operates at 5 MHz.

The bus can operate over distances of up to 15 meters using transceivers supporting a multi-drop interface in which up to thirty two communication system cabinets CAB1-CAB32 can be placed. The inter-connection is a twisted pair ribbon cable which uses standard push fit connectors.

The bus has a maximum operating speed of 10M bytes/sec when used in burst transfer mode and is parity protected. The 16 data lines are used for the address as well as the data. The bus uses a daisy chain arbitration acheme which is simple and cost effective.

There are a total of twenty four signals which make up the bus, of which twenty three are on the ribbon cable as follows:

| SIGNAL | NO OF LINES | COMMENTS |
| --- | --- | --- |
| Data 0 to 15 | 16 | These are the 16 address or data lines. |
| Parity low | 1 | Parity line for the lower data byte. |
| Parity high | 1 | Parity line for the upper data byte. |
| Clock | 1 | Bus clock with 20% duty cycle. Maximum speed 5 MHz. |
| Abort | 1 | This signal when active, aborts the present bus cycle. |
| Trans Active | 1 | This signal is active during a transfer. It is generated by the transmitting card. |
| Address Strobe | 1 | This signal is active during the address which is usually the first word of a frame. |
| Grant Return | 1 | This is the grant return signal from the the last card to the master arbitration card. |

There is also another signal called the grant signal. This is passed from one card to another and is not part of the twisted ribbon cable. This is simply a twisted pair wire which plugs into the cards via a separate connector.

Each cabinet has a bus converter which converts from the cabinet bus, a multi-master system bus for example, to the inter-bus system. One of these converters is always set up as the master card. The master card generates the clock signal (e.g. 5 MHz) and starts and ends each arbitration cycle. A cabinet can only transmit on the inter-bus system if it has control of the bus, otherwise it is in receive mode.

Referring to FIG. 2, the frame format will now be desribed. Data sent on the bus has to be transmitted in a frame. The ADDRESS FIELD is the first word to be transmitted. All of the bus converters have an address trap circuit which will trigger should the address being transmitted correspond to its system. The BYTE COUNT is the second word to be sent and is an inclination of the number of words being sent after it. This also includes the CRC if used. The DATA FIELD contains the data being transferred. The amount of data that can be transferred is limited by the byte count. In the packet switching system this would vary from 1 to 4096 bytes.

The CRC FIELD (Cyclic Redundancy Check) is added to provide an extra level of detection of data corruption. This is generated by the transmitting system.

The Transmitting System

The cycle begins with the master system using the bus if it requires it. If it does not, it transmits a grant pulse from its grant out pin which is connected to the grant in pin on the next card. This grant pulse is sent to the next card and so on until a system wants to transmit data to another system on the bus. If this is the case, the grant pulse is held back from going to the next system.

Once a system has been granted the bus it will begin its transmission cycle. The TRANS ACTIVE line is driven by the transmitter for the whole length of the transmission. The address word is sent first and is qualified by the ADDRESS STROBE line. This signal lasts the length of the clock cycle in which the address is being transmitted (200 ns). The data is then transmitted on the same line as the address. A word is transmitted on each falling edge of the CLOCK SIGNAL.

The transmission is finished when the TRANS ACTIVE line goes inactive. The grant signal is then passed on to the next card. The transmission can also be terminated when the ABORT signal is driven by either the transmitter or the receiver. The grant is not passed on until a clock cycle has elapsed from when the TRANS ACTIVE line goes inactive.

Receiving System

If a system has not been granted use of the inter-bus system then it is in the receiving mode. A receiving system monitors the TRANS ACTIVE line and if active checks to see if the ADDRESS STROBE is active. If both of these conditions are met, the first word, the address, is interrogated to see if the value corresponds to its own system. If there is no address match then the system will idle and wait for the next address strobe.

If a receiving system does have a correct address it will continue to accept more data. The next word is the byte count which the system uses to monitor the number of bytes sent. The system will continue to accept data until the byte count equals the number of bytes received. If the TRANS ACTIVE line is still active and data is still being sent then the receiver will drive the ABORT line. Also if the TRANS ACTIVE line is disabled before the correct number of bytes have been accepted that frame is also aborted. An abort signal is also generated by the receiver if the receiving parity is incorrect on any received byte.

Electrical Interface

The bus uses RS-485 transceivers. These components are readily available and are designed to work in multi-drop situations. Termination for the bus are via simple resistive loads. Up to thirty two transceivers can operate on the bus at one time, one transmit and thirty two in receive mode. The RS-485 uses a balanced voltage technique. Further information is available from the EIA specification for RS-485 (EIA standards proposal No. 1488, Electrical Characteristics of Generators and Receivers for use in Balanced Digital Multipoint Systems).

The GRANT line is implemented using an RS-422 interface, since multi-drop is not required.

Mechanical Interface

The systems are linked using fifty-way twisted pair ribbon cable. The mechanical connections are accomplished using DIN 41612 push fit connectors.

The GRANT signal is transmitted via a separate twisted pair cable using a simple two-way connector.

The invention is not limited to fast communication links between large systems in the communication field. It could be used in the computer industry for connecting large mainframes to high speed peripherals for example.

We claim:

1. An inter-bus system for interconnecting a plurality of communication systems by way of an interfacing means, each communication system is provided with a bus converter for interfacing the inter-bus system with the bus of each communication system, the inter-bus system includes a grant return path, and the bus converters are chained by a grant link arrangement, used to carry a grant pulse which is passed on around the chained bus converters to identify the master converter for an inter-bus system transfer; wherein, when the grant pulse is received by a bus converter wanting to transmit, that bus converter breaks the chain and performs the transmission required, when the transmission is complete the completing bus converter surrenders its master state by generating the grant pulse, said plurality of communication systems are inter-connected by a first line which is made active by a transmitter in the system, the converter of which disignated as the master, and remains active throughout the duration of a transmission, after which it is made inactive by the transmitter to allow the grant pulse to be passed on, and, wherein a system in a receiving mode monitors the first line to detect if it is active, and if an active line is detected, a second line which interconnects said plurality of communication systems is monitored to detect if it is in an active state, and if detected, address data being transmitted by another system is interrogated to ascertain if it corresponds to the address of the system in receiving mode, wherein the system in receiving mode continues to receive data if the address corresponds, the data next received indicates the number of bytes being transmitted by the other system, and the system in the receiving mode continues to accept data until a byte count equals the number of bytes received, and if data continues to be sent after the byte count equals the number of bytes received, while the first line is active, an abort signal is generated by the system in receiving mode.

2. An inter-bus system as claimed in claim 1, wherein if the first line, in an active state, is disabled before the correct number of bytes has been received, an abort signal is generated by the system in receiving mode.

3. An inter-bus system as claimed in claim 2 wherein the system in transmitting mode sends a cyclic redundancy check code to provide data corruption detection.

* * * * *